(No Model.)
L. MULLENHOFF.
TRAP FOR SINKS, &c.
No. 605,202. Patented June 7, 1898.
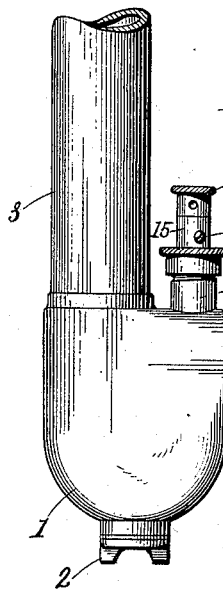
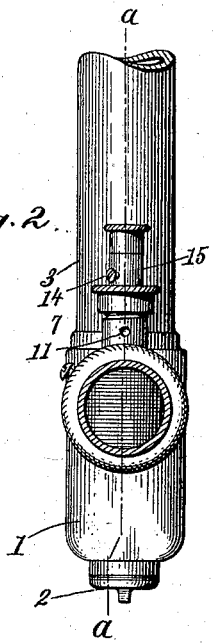
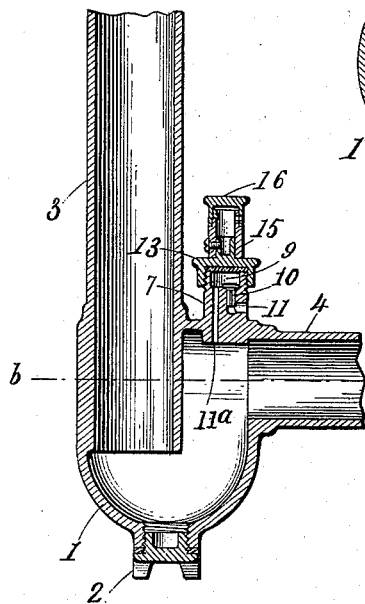
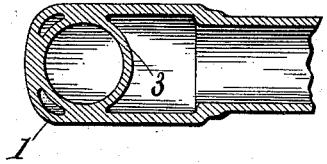
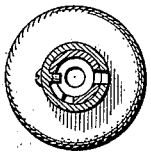
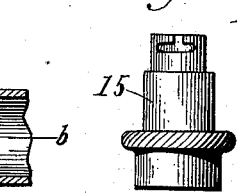
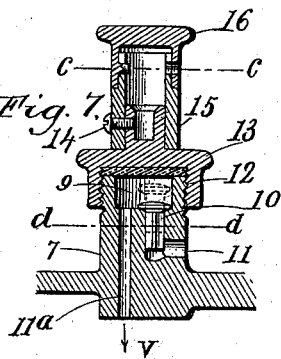
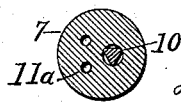
Witnesses,
L. M. Spong.
A. J. Sangster.
Leopold Mullenhoff Inventor.
By James Sangster, Attorney.
THE NORRIS PETERS CO., PHOTO-LITHO., WASHINGTON, D. C.

UNITED STATES PATENT OFFICE.

LEOPOLD MULLENHOFF, OF BUFFALO, NEW YORK.

TRAP FOR SINKS, &c.

SPECIFICATION forming part of Letters Patent No. 605,202, dated June 7, 1898.

Application filed June 27, 1896. Serial No. 597,205. (No model.)

*To all whom it may concern:*

Be it known that I, LEOPOLD MULLENHOFF, a citizen of the United States, residing in Buffalo, in the county of Erie and State of New York, have invented certain new and useful Improvements in Traps for Sinks or other Purposes, of which the following is a specification.

My invention relates to a new and improved antisiphoning-trap for sinks or other purposes, and it will be fully and clearly hereinafter described and claimed, reference being had to the accompanying drawings, in which—

Figure 1 represents a side elevation of the device complete. Fig. 2 represents a rear elevation of the same. Fig. 3 is a vertical central longitudinal section on or about line $a\ a$, Fig. 2. Fig. 4 represents a horizontal section on or about line $b\ b$, Fig. 3. Fig. 5 represents a horizontal section through the disinfecting-chamber case on or about line $c\ c$, Fig. 7. Fig. 6 represents a side elevation of the disinfecting-chamber and its support, the cover being removed. Fig. 7 is a detached sectional elevation of the disinfecting and valve chambers. Fig. 8 represents a horizontal section on or about line $d\ d$, Fig. 7.

One of the objects of my invention is to provide a simple and efficient means for preventing the siphoning of the trap and at the same time avoid the necessity of extending a pipe up through the ceiling and roof of the building in which the trap is located.

My invention is further designed to prevent the issue of foul air or gases through the trap into the building and also for disinfecting foul air or gases that may otherwise get into the building, all of which will appear farther on.

Referring to the drawings in detail, 1 represents the lower portion or bowl of the trap-case.

2 is the outlet or screw-stopper, made in the usual way to provide a means for getting at the trap for cleaning it.

3 represents the usual trap-pipe, extending down into the bowl below the surface of the water to prevent foul gases from getting through into the room. At one side or rear of the bowl is the horizontal or outward-extending portion 4 of the trap. It is provided with a coupling 5, (which may be of any well-known construction,) by which a pipe 6 may be connected therewith.

To one side or near the pipes 3 and 4 is a vertical pipe 7.

At the top of the pipe 7 is a screw-threaded portion, and its interior consists of a valve-chamber 9, within which is located a valve 10, that seats itself by gravity. (See Fig. 7.)

Below the valve 10 is an inlet-opening 11 for air, and near the valve is an opening or openings 11$^a$, extending from the interior of the trap to the chamber 9, so that when a draft is created in the direction of the arrow V the valve 10 will be lifted and air will pass in through the passage 11.

At the top of the valve-chamber case or pipe 7 is secured by a screw portion 12 a top piece 13, on the top of which is secured by a set-screw 14 a case 15, carrying disinfecting material. It is provided with a removable cover 16.

The operation of this device is as follows: When from any cause the conditions tend to draw the water out of the trap, the valve 10 will be raised, as hereinbefore mentioned, and allow the air to pass in, and the siphoning of the trap is thereby prevented. If from any cause there should be a rush of foul gas and water up into the trap, the valve 10 will be forced down and tightly closed and thereby prevent the gas from getting into the apartment with which the trap may be connected.

I claim as my invention—

In a water-trap, the combination with the trap, its valve and valve-chamber, of a screw-cap for closing the top opening in said valve-chamber, and having a reduced portion extending vertically from the top thereof, tubular portions adapted to seat and be seated upon the reduced portion, and provided with a transverse slot, and a circular opening and a cap provided with a pin fitting in said slot and an opening adapted to register with the opening in the tubular portion, when the cap is rotated to the proper position upon said tubular portion, as set forth.

LEOPOLD MULLENHOFF.

Witnesses:
L. M. SPONG,
A. J. SANGSTER.